United States Patent [19]

Reeves et al.

[11] Patent Number: 5,780,520
[45] Date of Patent: Jul. 14, 1998

[54] LEACHING CONTAMINANTS FROM POST-CONSUMER FOR REUSE IN FOOD-CONTACT APPLICATIONS

[75] Inventors: Billy J. Reeves, Surgoinsville; Michael P. Ekart, Kingsport; William H. Heise, Kingsport; Johnny W. Shadden, Kingsport; Candace M. Stipe, Kingsport, all of Tenn.

[73] Assignee: Eastman Chemical Company, Kingsport, Tenn.

[21] Appl. No.: 772,236

[22] Filed: Dec. 23, 1996

Related U.S. Application Data

[63] Continuation of Ser. No. 386,243, Feb. 9, 1995, abandoned.

[51] Int. Cl.$^6$ ............................................. C08J 11/04
[52] U.S. Cl. ................ 521/48.5; 528/272; 528/302; 528/308; 528/308.6; 528/481; 528/493; 528/495; 528/503; 8/141
[58] Field of Search ........................ 528/272, 302, 528/308, 308.2, 308.6, 481, 493, 495, 503; 521/48.5; 8/141

[56] References Cited

U.S. PATENT DOCUMENTS

| | | | |
|---|---|---|---|
| 3,806,316 | 4/1974 | Lewkowitz et al. | 8/103 |
| 4,003,880 | 1/1977 | Sidebotham et al. | 528/487 |
| 4,003,881 | 1/1977 | Sidebotham et al. | 528/487 |
| 4,064,079 | 12/1977 | Sidebotham et al. | 521/48 |
| 4,064,112 | 12/1977 | Rothe et al. | 528/272 |
| 4,118,187 | 10/1978 | Sidebotham et al. | 8/102 |
| 4,137,393 | 1/1979 | Sidebotham et al. | 528/491 |
| 4,680,060 | 7/1987 | Gupta et al. | 134/26 |
| 5,049,647 | 9/1991 | Al-Ghatta | 528/272 |
| 5,073,203 | 12/1991 | Al-Ghatta | 134/11 |

OTHER PUBLICATIONS

Points to Consider for the Use of Recycled Plastics in Food Packaging: Chemistry Considerations, U.S. Food & Drug Administration, May, 1992.

*Primary Examiner*—Samuel A. Acquah
*Attorney, Agent, or Firm*—Karen A. Harding; Harry J. Gwinnell

[57] ABSTRACT

A novel technique to treat post-consumer polyester for reuse in food-contact applications is described. The process comprises contacting contaminated post consumer polyester flake with at least one extraction solvent which is soluble in said contaminated flake at a temperature sufficient to allow rapid diffusion of contaminants from said polyester flake; and removing said extraction solvent containing said contaminants from said polyester flake.

17 Claims, No Drawings

LEACHING CONTAMINANTS FROM POST-CONSUMER FOR REUSE IN FOOD-CONTACT APPLICATIONS

This is a continuation of application Ser. No. 08/386,243 filed on Feb. 9, 1995 now abandoned.

BACKGROUND

Concern for the environment has provided an impetus for using food containers that are at least partially comprised of recycled post-consumer materials. Glass and metal containers have long been recycled by cleaning the surface of these nearly impermeable materials. Plastics, conversely, could absorb contaminants, making it risky to depend on conventional cleaning techniques.

The Food and Drug Administration (FDA) addresses plastics recycling in the pamphlet "Points to Consider for the Use of Recycled Plastics in Food Packaging: Chemistry Considerations." An upper limit of 0.5 ppb of any contaminant in the daily diet is considered to be of negligible risk. An example is presented for a 20 mil polyethylene terephthalate (PET) container with very conservative assumptions; the result is that a contaminant should not be present in the polymer at greater than 0.217 ppm.

For polyesters, one technique to remove contaminants is chemical treatment to render the post-consumer material back to its monomeric components which can be purified, then repolymerized to the parent polyester which can be formed into a recycled container. This process, while robust at removal of contaminants, can be more costly than production of virgin polyester. It is therefore desirable to develop an inexpensive process to remove contaminants from post-consumer plastic packaging. This invention reveals a process that satisfies the FDA guidelines in an economical fashion.

U.S. Pat. Nos. 5,049,647, "Method for the Reduction of Impurities in Polyester Resins," and 5,073,203, "Method for Recycling Polyethylene Terephthalate (PET) Beverage Bottles by Treating with Carbon Dioxide," describe a technique to extract contaminants from PET with supercritical carbon dioxide, a solvent that is well known for its excellent mass transfer properties. Supercritical $CO_2$, however, is an expensive solvent requiring costly equipment because of the high pressures that are required, and is unlikely to be feasible on a commercial scale.

U.S. Pat. No. 4,680,060, "Process for the Extraction of Contaminants from Plastics," reveals a technique to remove contaminants, such as pesticides, from plastic containers by flushing with propylene glycol. Although this process may remove the contaminants adsorbed on the surface of the plastic, contaminants absorbed within the plastic would be unaffected. This technique, therefore, may not satisfy the current FDA guidelines.

Several inventions (for example, U.S. Pat. No. 3,806,316, "Process for Extracting Dyes From Textiles," U.S. Pat. No. 4,003,880 and U.S. Pat. No. 4,118,187, "Fabric Dye Stripping: Separation and Recovery of Polyester") describe, as parts of processes, steps to strip dyes and/or finishes from polyester fibers by contact with a solvent. The solvents employed are chlorinated, particularly methylene chloride, or aromatic thus would not be desirable in food-contact applications. Thus there remains a need in the art for an extraction process which is capable of removing contaminants to minute levels with solvents which are desirable in food contact applications as well as practicable on a commercial scale.

DESCRIPTION OF THE INVENTION

This invention describes a new process to remove contaminants from post-consumer polyester packaging materials; the material thus treated would be acceptable to the FDA for food-contact applications and meet the specifications required for further processing. The process comprises contacting contaminated post consumer polyester flake with at least one extraction solvent which is soluble in said contaminated flake at a temperature sufficient to allow rapid diffusion of contaminants from said polyester flake; and removing said extraction solvent containing said contaminants from said polyester flake.

The polyesters are any polyesters which are suitable for use in packaging, and particularly food packaging. Suitable polyesters are generally known in the art and may be formed from aromatic dicarboxylic acids, esters of aromatic dicarboxylic acids, glycol and mixtures thereof. More preferably the polyesters are formed from terephthalic acid, isophthalic acid, dimethyl terephthalate, dimethyl isophthalate, ethylene glycol, diethylene glycol, cyclohexanedimethanol and mixtures thereof.

In this process, post-consumer polyester flake is fed into a leaching system where it is contacted with an extraction solvent. It has been found that with an appropriate solvent and temperature, contaminants diffuse unexpectedly rapidly through the polymer and reach equilibrium with the solvent. It is very important that the diffusivity of the contaminants is large, because the driving force for diffusion, concentration difference, becomes very small as the contaminant levels required by the FDA are approached. Because of the rapid diffusion that occurs in the process described in this invention, contaminants can be removed on a commercially viable time scale. To remove contaminants to an allowable level, a system with multiple stages with countercurrent or crosscurrent solvent flow, such as a continuous countercurrent multistage system or a batch countercurrent multiple-contact system would be preferred.

The preferred solvents or solvent mixtures have a number of characteristics. The solvent should be soluble in the polyester, resulting in polymer swelling which facilitates the rapid mass transfer; however, the solvent should not dissolve or significantly degrade the polyester nor lead to color formation. Preferably, the solvent should remove a wide range of contaminants, both polar and non-polar. It is also desirable that the solvent be easily removed from the polyester following the extraction. The solvent should be environmentally benign and not have deleterious effects on human health. Finally, it is preferable that the solvent be inexpensive. The preferred solvents include esters, ketones, alcohols, glycols, and fatty acid triglycerides, mixtures of the above, and mixtures of the above with water. More preferably the solvents are esters, ketones and fatty acid triglycerides. Most preferred are acetone, butanone, ethyl acetate, n-propyl acetate, corn oil and MYGLYOL® 812, available from Dynamit Nobel Chemicals.

The preferred temperatures are those at which sufficient free volume exists in the polyester/solvent system to allow rapid diffusion of contaminant molecules; the presence of the preferred solvents plasticizes the polyester, significantly increasing the free volume relative to that of the solvent-free polymer. This has the effect of lowering the glass transition temperature. Thus, the temperature is preferably above the glass transition temperature for acetate, for example, the preferred temperature range for cleaning poly(ethylene terephthalate) is above 80° C., more preferably 80° to 125° C. Of course, if the vapor pressure of the solvent is above atmospheric pressure at the temperature of the leaching, a vessel operating above atmospheric pressure is required.

The optimum extraction time per stage is dependent upon the solvent and temperature. For ethyl acetate at 120° C., equilibrium is reached in less than 30 minutes.

Following the leaching step, it is important to restore the polyester to a product fit for reuse. This includes removal of the solvent from the flake and restoring the polyester to a suitable form and molecular weight. Following leaching, the flake is separated from the liquid solvent, then dried to remove the majority of any residual solvent. Contaminants may be removed from the recovered leaching solvent so that it could be reused.

Next, the flake could be extruded and pelletized, preferably in a vented extruder so that residual solvent or contaminant vapors would be easily removed. If necessary, the resulting pellets could then be crystallized and solid-stated, resulting in a product acceptable for use in food-contact applications. Solid-state polycondensation processes are well known in the art as illustrated by U.S. Pat. No. 4,064,112. The polyester is heated to above the glass transition temperature but below the crystalline melting point; polycondensation byproducts are removed by sweeping inert gas over the polyester or applying vacuum.

The extrusion, crystallization, and solid-stating steps all result in the removal of any remaining solvent; in addition, if minor degradation occurs during leaching and extrusion, the molecular weight of the polymer is restored to an appropriate level. The product of this process is 100% recycled polyester suitable for use in food contact products such as bottles. Products incorporating the recycled polyester could contain up to 100% recycle content.

Alternatively, following drying to remove the solvent, the flake could be fed into a melt-phase polyester production line. Such processes are well known in the art, and include esterification of dicarboxylic acid(s) or transesterification of esters of dicarboxylic acid(s) with diol(s) followed by polycondensation under reduced pressure. The decontaminated polyester could be fed at any desired point in the process. Here, the flake would undergo partial depolymerization prior to building up to a suitable molecular weight. In this process, the recycled material could be blended with virgin raw materials to produce a material with any desired level of recycle content.

Comparative Example

Polyester flake contaminated with 388 ppm lindane (determined by Soxhlet extraction) was subjected to a conventional cleaning technique. Lindane is a non-polar, non-volatile solute that represents a difficult type of contaminant to remove. An 8% slurry of the tainted flake in a wash solution consisting of water with 1% Oakite® RC3 detergent was stirred for 30 minutes at 82° C. Following this washing, the flake was dissolved in trifluoroacetic acid. The contaminant was extracted from the acid with n-nonane, and analyzed via gas chromatography. The level of lindane in the flake was determined to be 237 ppm. The level of lindane remaining is 1000 times greater than that currently required by the FDA.

EXAMPLES

The following Examples show that the method of the present invention is capable of removing contaminants up to 500 times better than conventional cleaning techniques. Typically polyester collected for recycle contains less than about 2 ppm of any given contaminant and under any plausible circumstances would not be likely to contain more than about 20 ppm of any single contaminant such as lindane, toluene and methyl salicylate. The polyesters tested below contained 187–546 ppm lindane, 29,500–49,100 ppm toluene and 136,000 methyl salicylate. These extraordinary concentrations of contaminants were required to show the degree of removal achievable with the process of the present invention because the limits of detection on the analytical equipment used is about 0.4 ppm.

Example 1

To 200 g of polyester bottle flake contaminated with 546 ppm lindane, 400 g of ethyl acetate were added in an autoclave. The bottle flake in this Example and Examples 2 and 4 was PET modified with 1.5 mole % cyclohexanedimethanol. The mixture was heated, with stirring, to 250° F. (121° C.) where it was held for two hours. After cooling, the solvent was filtered from the flake, and the flake washed and dried overnight in a vacuum oven at 140° F. (60° C.). The dried flake was dissolved in trifluoroacetic acid. The contaminant was extracted from the acid with n-nonane, and analyzed. The product flake contained 61 ppm lindane, indicating that 89% of the lindane was removed in only 2 hours in a single cycle. As shown by the following Examples, appropriate levels may be reached by adding the appropriate number of extractions.

The analysis Example 2 was also conducted using trifluoroacetic acid and n-nonane.

Example 2

Polyester bottle flake (200 g) contaminated with 388 ppm lindane (analyzed by Soxhlet extraction) was mixed with 400 g of ethyl acetate in an autoclave at 250° F. (121° C.). After two hours, the level in the lindane in the flake was about 52 ppm. Longer extraction times removed no additional lindane from the flake. The mixture was cooled and the contaminated solvent was filtered off. The flake was washed, dried and mixed with 400 g of fresh ethyl acetate solvent and placed in an autoclave at 250° F. After four hours, the lindane in the flake was reduced to 1.0 ppm. The solvent was filtered off, the flake washed and 400 g of fresh ethyl acetate was added. The mixture was placed in an autoclave at 250° F. for four hours. A flake sample was cryogenically ground into fine particle and mixed with a large excess of acetone. The mixture sat overnight, then the acetone was analyzed for lindane. The level of lindane in the flake was 0.43 ppm, which is nearly 50 times better than the conventional cleaning technique described in the comparative example.

Example 3

A thermal desorption unit linked to a gas chromatograph was used to determine the amount of toluene present in the flake samples. Two hundred grams of polyester flake were contaminated with 49,100 ppm toluene, a volatile, non-polar contaminant. The flake was mixed with 400 g ethyl acetate in an autoclave and heated to 250° F. for one hour. After separating the liquid, 400 g of fresh ethyl acetate were added to the flake and another extraction was conducted. The process was repeated until four extractions were completed. Following the treatment, the flake contained 1.57 ppm toluene, a 99.997% removal of toluene. It is expected that post-consumer PET flake would contain much lower levels of toluene than that used for this experiment, so that 99.997% removal would render the PET safe. Clearly more extractions could be conducted to get higher removal efficiencies if necessary.

Example 4

Two hundred grams of polyester flake were contaminated with 136,000 ppm methyl salicylate, a volatile, polar contaminant often found in postconsumer PET. The flake was mixed with 400 g ethyl acetate in an autoclave and heated to 250° F. for one hour. After separating the liquid, 400 g of fresh ethyl acetate were added to the flake and another extraction was conducted. The process was repeated until four extractions were completed. Following the treatment, the flake contained 25.4 ppm methyl salicylate, a 99.98% removal of methyl salicylate. This shows that excellent removal efficiencies can be obtained with a polar compound. Clearly more extractions could be conducted to get higher removal efficiencies.

Example 5

Two hundred grams of polyester flake made of PET modified with 3% isophthalic acid were contaminated with 187 ppm lindane. After mixing with 400 g ethyl acetate, it was heated to 250° F. in an autoclave for one hour. The ethyl acetate was removed, and lindane was extracted from the flake as described in Example 1. The polymer contained 20.5 ppm lindane after only a single extraction. Thus contaminants may be readily removed from polyester containing isophthalic acid via the present invention.

Example 6

A 16 g sample of PET flake containing 28,500 ppm toluene was placed in 61 g Miglycol 812 oil and heated at about 121° C. for 2 hours. The oil was decanted from the flake and the flake was padded as dry as possible between filter paper. The flake was then placed in a soxhlet apparatus to remove the oil, refluxed for 24 hours with ethyl acetate and the ethyl acetate was removed from the system. Methylene chloride was added and the sample was extracted for 24 hours, concentrated to 25 ml and analyzed by GC for toluene. The amount of toluene remaining in the flake was determined to be 4037 ppm (86% removal) after a single 2 hour extraction. Additional batch or continuous extractions could be conducted to obtain acceptable levels.

We claim:

1. A process comprising:
  contacting contaminated post consumer polyester with at least one extraction solvent selected from the group consisting of acetone, butanone, ethyl acetate, n-propyl acetate, corn oil and a mixed acid triglyceride of fractionated coconut fatty acids $C_8$–$C_{10}$, having a fatty acid composition of up to 2% caproic acid ($C_6$), 50–65% caprylic acid ($C_8$), 30–45% capric acid ($C_{10}$) and up to 3% lauric acid ($C_{12}$), at a temperature sufficient to allow rapid diffusion of contaminant from said polyester; and
  separating said extraction solvent containing said contaminants from said polyester to produce a polyester which is suitable for food contact applications.

2. The process of claim 1 wherein said temperature is above the glass transition temperature for the polymer solvent mixture.

3. The process of claim 1 wherein said contacting and removing steps are repeated until the amount of said contaminant remaining in said polymer is less than about 220 ppb.

4. The process of claim 1 wherein said contacting step is conducted in a counter or cross current system.

5. The process of claim 4 wherein said system is a continuous countercurrent multistage system or a batch countercurrent multiple stage system.

6. The process of claim 1 wherein said extraction solvent is selected from the group consisting of ketones, alcohols, glycol, fatty acid triglycerides, mixtures thereof and mixtures with water.

7. The process of claim 1 wherein said extraction solvent is selected from the group consisting of ketones, fatty acid triglycerides, mixtures thereof and mixtures with water.

8. The process of claim 1 wherein said polyester is polyethylene terephthalate and said temperature is greater than about 80° C.

9. The process of claim 8 wherein said temperature is between about 80° C. and about 125° C.

10. The process of claim 1 further comprising extruding and pelletizing said decontaminated polyester flake.

11. The process of claim 10 further comprising crystallizing said decontaminated polyester pellets.

12. The process of claim 10 further comprising solid-stating said decontaminated polyester pellets to increase molecular weight of said decontaminated polyester pellets.

13. The process of claim 10 wherein said extruding step is conducted in a vented extruder wherein residual solvent and/or polycondensation byproducts are removed thereby increasing molecular weight of said polyester flake to a desired level.

14. The process of claim 1 further comprising the step of feeding decontaminated polyester flake to melt phase production of polyester material.

15. The process of claim 1 wherein said polyester is formed from at least one glycol and at least one aromatic dicarboxylic acid, ester of said aromatic dicarboxylic acid or mixture thereof.

16. The process of claim 15 wherein said dicarboxylic acid is selected from the group consisting of terephthalic acid, isophthalic acid; said ester of said aromatic dicarboxylic acid is selected from the group consisting of dimethyl terephthalate and dimethyl isophthalate; and said at least one glycol is selected from the group consisting of ethylene glycol, diethylene glycol, cyclohexane dimethanol and mixtures thereof.

17. The process of claim 1 wherein said post consumer polyester is in flake form.

* * * * *

UNITED STATES PATENT AND TRADEMARK OFFICE
CERTIFICATE OF CORRECTION

PATENT NO. : 5,780,520
DATED : July 14, 1998
INVENTOR(S) : Reeves et al.

It is certified that error appears in the above-identified patent and that said Letters Patent is hereby corrected as shown below:

Column 6, line 46 (Claim 16, line 1), before "dicarboxylic acid", ---aromatic--- should be inserted.

Signed and Sealed this

Twenty-second Day of September, 1998

Attest:

BRUCE LEHMAN

Attesting Officer  Commissioner of Patents and Trademarks